United States Patent [19]

Hauer

[11] 4,330,951
[45] May 25, 1982

[54] VISUALIZER DISPLAY DEVICE

[76] Inventor: James E. Hauer, 704 Royal Blvd., Green Bay, Wis. 54301

[21] Appl. No.: 244,744

[22] Filed: Mar. 17, 1981

[51] Int. Cl.³ .............................................. G09F 1/10
[52] U.S. Cl. ............................. 40/124.2; 40/158 A; 434/90; 434/72
[58] Field of Search ................. 40/124.2, 124, 489, 40/490, 491, 158 A, 611; 434/72, 80, 90, 416, 430

[56] References Cited

U.S. PATENT DOCUMENTS

| | | | |
|---|---|---|---|
| 228,273 | 6/1880 | Peabody | 434/90 |
| 413,026 | 10/1889 | Catlin | 40/124.2 |
| 470,861 | 3/1892 | Chichester | 434/416 |
| 886,320 | 4/1908 | Ferrero | 40/124.2 |
| 913,262 | 2/1909 | Cohen et al. | 40/489 |
| 3,466,126 | 9/1969 | Sakamoto | 40/124 |
| 3,816,948 | 6/1974 | Mooney et al. | 40/124.2 |
| 3,863,371 | 2/1975 | Shertenlieb | 40/124.2 |
| 3,959,904 | 6/1976 | Holliday | 40/124.2 |
| 4,081,080 | 3/1978 | Rorex | 40/124.2 |

FOREIGN PATENT DOCUMENTS 1486785  6/1967  France .................................. 40/611

Primary Examiner—Robert Peshock
Assistant Examiner—John J. Wilson
Attorney, Agent, or Firm—Russell L. Johnson

[57] ABSTRACT

A visualizer presentation device comprising a portfolio having a display cover hingably joined to a storage cover and the storage cover has detachably secured thereto at least one file of hinged transparent sleeves for receiving file cards. The display cover has corner pockets configured so as to receive and index transparent, information carrying graphics in overlaying relationships one with the other. The storage cover has a transparency storage pouch having a transparency receiving opening directed towards the hinge of the portfolio. The transparencies have indicia bearing tabs secured thereto in such a way as to project from the storage pouch and provide ready identification of the graphics contained on the transparencies. Files of hinged transparent sleeves are detachably secured to the storage cover. The visualizer is constructed and configured so as to be equally utilitarian when in an easel configuration and when laying flat.

5 Claims, 4 Drawing Figures

VISUALIZER DISPLAY DEVICE

BACKGROUND OF THE INVENTION

The managing of physical plants has long presented difficulty to management personnel due to the need to make decisions involving the interrelationships of the numbers of the technically complex systems found in the physical plants of most industries and businesses. When considering alternatives for additions to or modifications of plant or process it is necessary for management to consider the effects such changes and their alternatives will have on existing systems and what new systems if any will be needed.

The establishing and maintaining of the body of technical graphics and the related data in an accessible and readily usuable form has been a cumbersome process due to the variety and diversity of the forms and the locations in which such graphics and data are kept. Heretofore the provision of such data and graphics in an easily transported and displayed form has been a difficult and a time consuming process.

The process of managing physical plant changes begins with reviews of options. This involves meetings and conferences involving one or two key personnel at a time. When the options available are well defined, conferences are held with somewhat larger groups of involved management personnel. The last step is the presentation of a proposed course of action to top management. It is highly desirable that the same or similar data and technical graphics be used throughout the decision making process and that the data and graphics be in a form which is readily assimilated and used by management.

It is therefore an object of this invention to provide a visual communications materials storage carrying and display means wherein technical graphics and data related thereto may be readily stored, transported and displayed in a manner that is compatible with the needs of the various steps of the physical plant management process.

It is further an object of this invention to provide the visual display means as described above wherein technical graphics may be provided on a transparent substrate and wherein the graphics may be displayed in overlaying indexed relationship one with the other.

It is further an object of this invention to provide as a part of the above described display means a data file storage and display means having contained therein data cards having indicia thereon which correspond to indicia on the technical graphics.

Is is further an object of this invention to provide the technical graphics materials and data in a form that is easy to maintain and update by clerical personnel.

Other objects of the invention will become apparent from the following detailed descriptions and appended claims.

BRIEF DESCRIPTION OF THE INVENTION

In its simplest form the visualizer display device of this invention is a portfolio like folder having a front and a back cover which are hingably joined so that when the cover is closed the contents of the portfolio are securely contained between the covers. When opened either in an easel configuration or laying flat, the inside of the front cover serves as a display surface and the inside of the back cover serves as a materials storage area. The storage area has a transparency storage pouch which is substantially coextensive with the back cover and the pouch opening is directed towards the hinge of the folder. Graphics containing transparencies are stored in the pouch. The transparencies have index tabs secured to them so that the tabs extend from the pouch in laterally offset relationship one with the other to facilitate identification of and removal of the transparency from the pouch. A row or rows of hinged transparent flat sleeves are detachably secured to the outside of the storage pouch. The rows of sleeves and their securement means are configured so that the row of sleeves may be detached from the storage area and also so that the row of sleeves may be positioned on the pouch with the ends of the row transposed so as to facilitate use of the visualizer in one or more of its several modes of use.

DETAILED DESCRIPTION OF THE INVENTION

Figure 1:
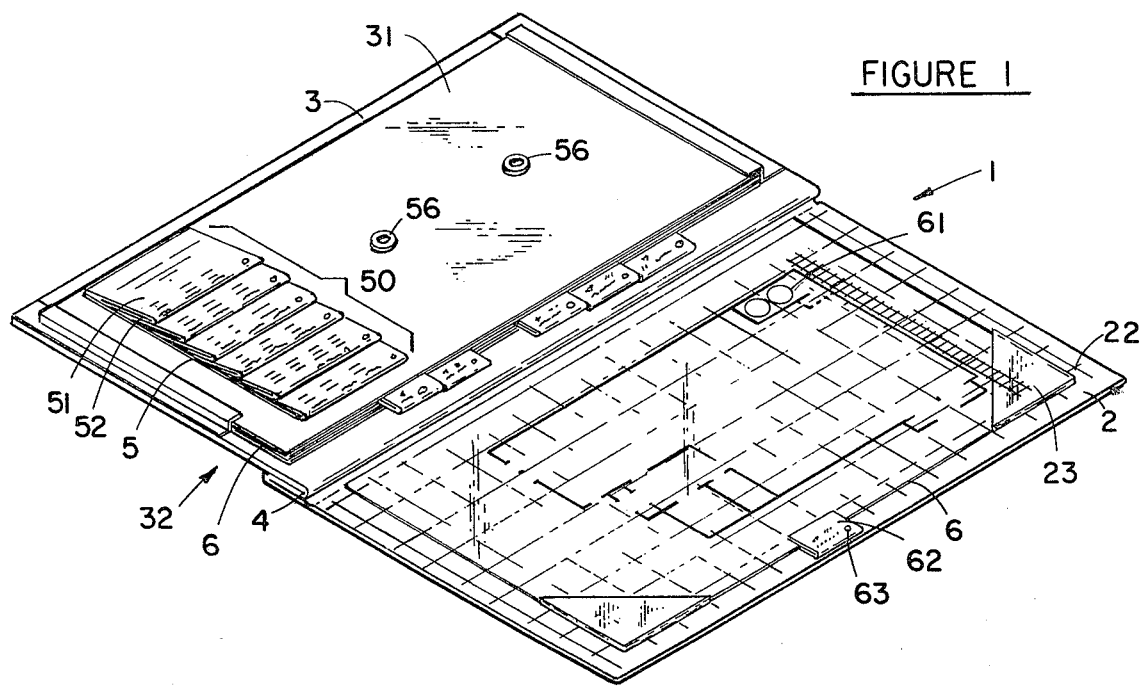
FIG. 1 is a pictorial view of the visualizer display device of this invention in the open position.

In the figures like numbers refer to like objects.

Referring now to FIG. 1 through 4. Visualizer 1 comprises front display cover 2, back storage cover 3, hinge 4 and master file 5.

Display cover 2 of stiff material has as a part thereof a display area having imprinted thereon scale and measuring guide 22. Display receiving corner pockets 23 are positioned at the non hinged corners of the display area. Pockets 23 are preferably of transparent flexible material such as plastic film or the like.

Storage cover 3 of stiff material has secured thereto and substantially coextensive therewith transparency storage pouch 31. Pouch 31 is open at the hinge edge and closed along the non hinged sides of cover 3 except that a short segment 32 of the edge of pouch 31 near hinge 4 may be open to permit ease of placing transparencies 6 into pouch 31.

Hinge 4 of flexible material hingably joins display cover 2 and storage cover 3. Hinge 4 may be any suitable hinging means similar to those provided in conventional portfolios.

File 5 comprises a row 50 of transparent sleeves 51 for receiving file cards 52. Transparent sleeves 51 are secured as shown to a file base which may have secured thereto snap member 55. Snap member 55 is detachably engagable with snap member 56 which is secured to pouch 31 as shown.

Transparencies 6 are of transparent material such as Mylar or the like which has graphics 61 indelibly imposed thereon. Transparency 6 has tab 62 secured along one edge. Tab 62 projects from the edge of transparency 6 and each tab 62 is positioned so as to be laterally offset from corresponding tabs 62 on other transparencies 6 when the transparencies are stored in pouch 31.

A preferred manner of using the article of this invention is as described below.

Transparencies 6 might typically be prepared for a commercial facility. Typical content of individual transparencies 6 might be;
(1) Plat layout
(2) Building floor plan(s)
(3) Electrical power
(4) Steam and compressed air/vacuum
(5) Heating, Ventilating and Air Conditioning (HVAC)
(6) Fixed equipment layout
(7) Fire and health and safety
(8) Materials flow
(9) Lighting and electrical/electronic
(10) Water and waste
(11) Etc.

Transparencies 6 may have a substrate of Mylar (T.M.) or any other suitable material. Graphics and indicia may be indelibly imposed upon the substrate by conventional means. Notes, sketches and tentative layouts may be temporarily entered upon the transparency by means of writing with markers or suitable felt tip pens or the like. The provision of new or updated transparencies can be achieved by clerical workers using ordinary office copy equipment.

Tabs 62 attached to transparencies 6 have placed thereon indicia 63 which may be colors, graphics, symbols, letters, numbers and the like. Indicia 63 informs the user of the content of the transparency 6 having the tab 62 having indicia 63 and also permits him to identify the master cards of file 5 which relate to transparency 6.

Master cards typically may contain information concerning;
(1) Manufacturer and model of equipment
(2) Date of purchase and model number(s)
(3) Responsible company personnel
(4) Manufacturer's personnel to contact
(5) Maintenance operations program
(6) Power and utility requirements
(7) Location of purchase information
(8) Location of detailed drawings, data and parties to contact for additional information Each transparency will have its own set of key elements and data. The above can be viewed as representative of the types of information which may be provided on the master file cards.

The following exemplifies the mode of use of the visualizer of this invention. A plant manager may be asked to provide his corporate management with an analysis of the feasibility of adding production capacity to his plant. The manager would then employ the visualizer as shown in FIG. 1 and place the plant layout on display cover 2. He might then overlay the equipment transparency and temporarily mark in several possible layout modifications for achieving the proposed increase in production capacity. Using the indicia on the equipment transparency he would then go to master file 5 and locate the master file cards which would provide him with information on capacities and requirements of the new equipment to be installed. He would then, by using the transparencies containing electrical, materials flow, and other relevant factors, be able to evaluate the prospective changes.

Figure 2:
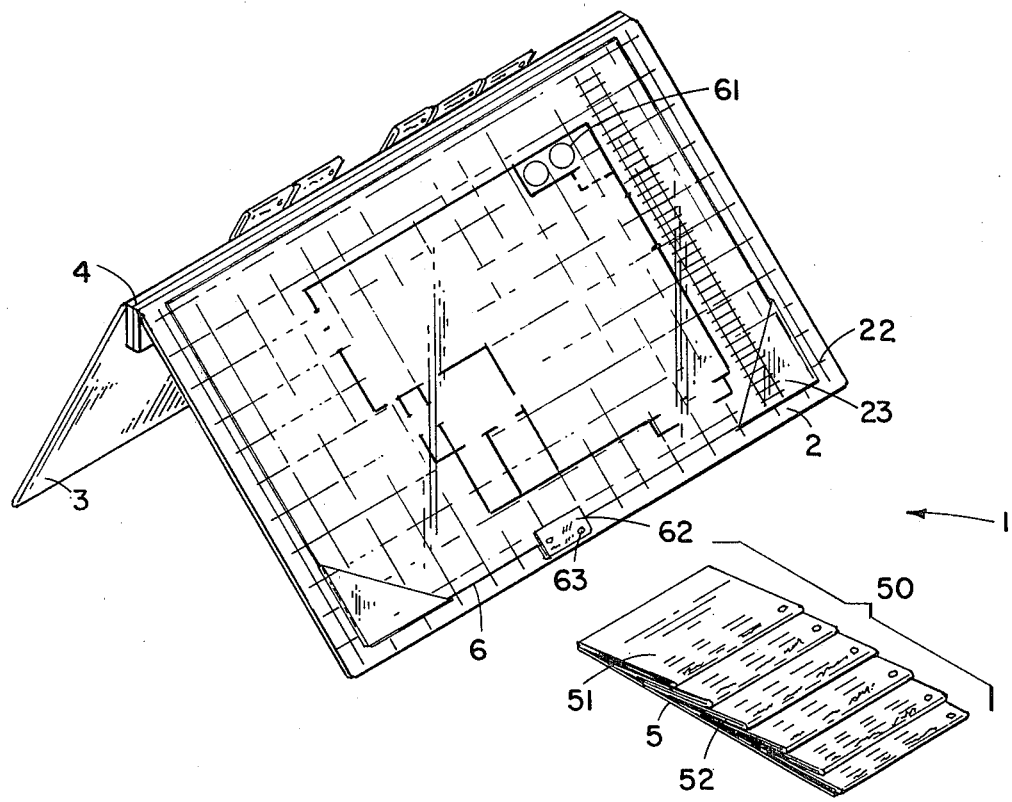
FIG. 2 is a pictorial view of the visualizer display device of this invention in the easel position.

After evaluating the possible changes and eliminating those that are clearly not feasible he might call in key people from the plant to get their inputs on the proposed changes. He might then employ the visualizer in the easel position as shown in FIG. 2 with file 5 detached or he may choose to leave file 5 attached but inverted so file 5 reads right to him when he is standing on the side of storage cover 3. When used in this manner small groups may review the work and further refine proposals for achieving the increase in capacity.

Once the review is complete the visualizer may be used to communicate the options for the proposed changes to a small group of top management people or alternatively the visualizer may be used as a convenient portfolio to organize the materials and carry them to a conference involving a larger group of people where the transparencies will be displayed by projection on a screen and file 5 will provide a ready reference file of key data for use by the presenter.

The preferred embodiment of the invention and a preferred mode of using the invention have been disclosed above. There are, however, modifications of the disclosed invention which may be made without departing from the scope of the invention.

Figure 3:
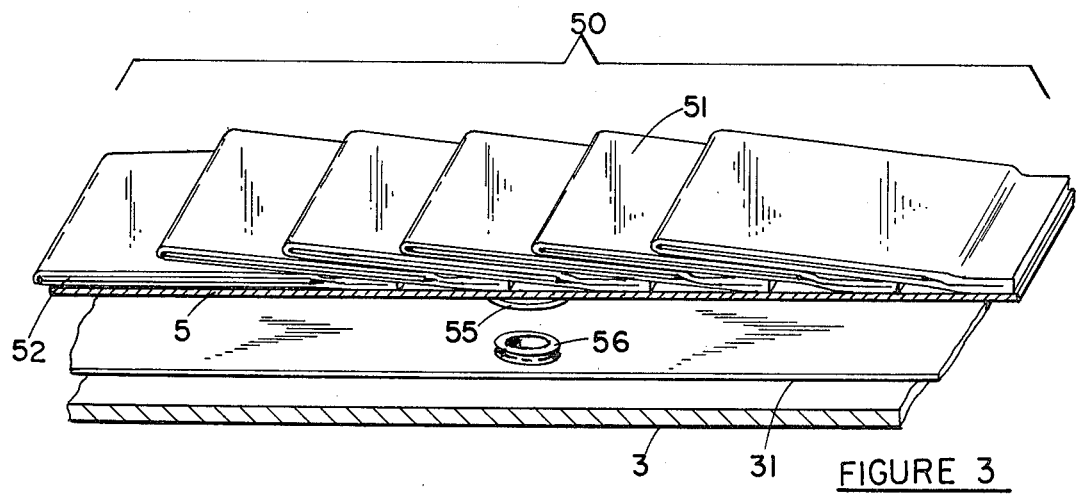
FIG. 3 is a fragmentary partially sectioned pictorial view of a file of sleeves configured according to a preferred embodiment of the invention.
Figure 4:
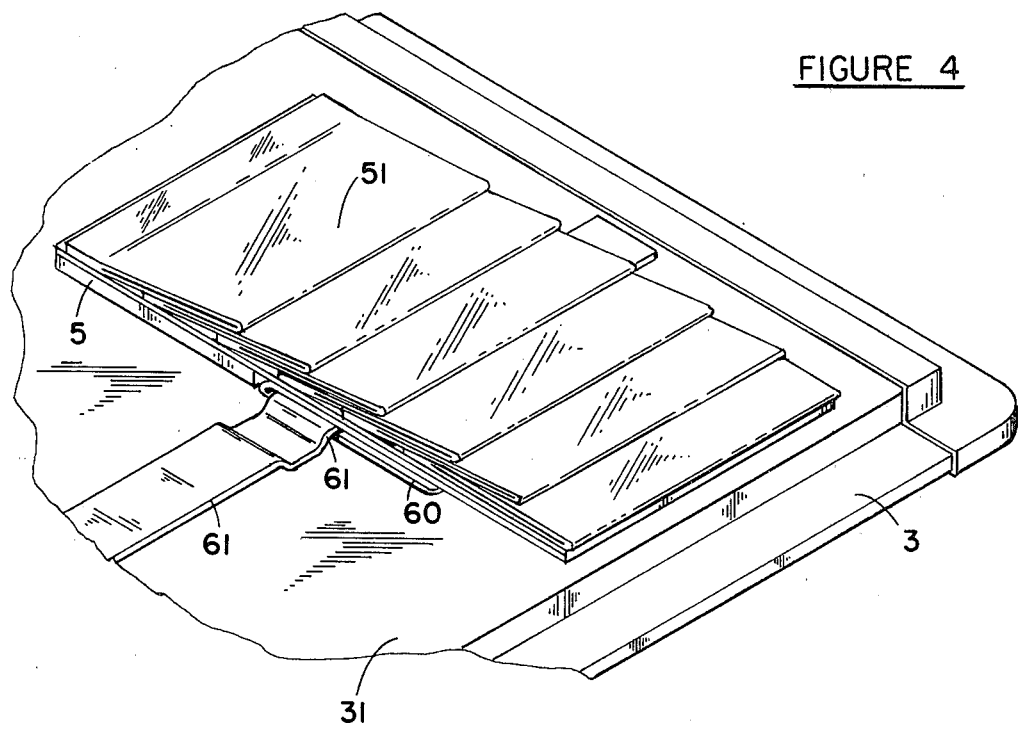
FIG. 4 is a fragmentary partially sectioned pictorial view of a file of sleeves configured according to another embodiment of the invention.

As an example snap members 55 and 56 of FIG. 3 may be replaced by tab 60 of FIG. 4 on file 5 and loop 61 on pouch 31, without departing from the scope of the invention. Also, multiple securement means such as loops 61 may be provided so as to permit the storage of multiple files 5 on the storage cover.

It therefore should be understood that the scope of the invention should be limited only by the scope of the appended claims and all equivalents thereto which would become apparent to one skilled in the art.

I claim:
1. A visualizer display device comprising;
 (1) a rectangular display cover of stiff material having a hinge edge and an opposite indexing edge and two side edges and the indexing edge is provided at its corner intersections with the side edges with a display receiving and indexing means,
 (2) a rectangular storage cover of stiff material having a hinge edge, an opposite edge and two side edges, and the storage cover is hingably joined to the display cover at their respective hinge edges and the storage cover has as a part thereof a display storage pouch which is substantially coextensive with the storage cover and the pouch is open at the hinge edge and is closed at the side edges and at the opposite edge of the storage cover,
 (3) at least one row of hinged transparent sleeves configured so as to receive conventional file cards and the row of hinged sleeves as a unit is detachably secured to the storage pouch by conventional securement means,
 (4) a plurality of transparent displays, each display being formed of a rectangular substrate of transparent material and having two side edges, a tab edge, and an opposite edge and the substrate has indelibly imprinted thereon graphics, indicia and the like and the tab edge of each display has secured thereto a tab which projects therefrom and which has contained thereon identification indicia and the tabs of each display is positioned so that when the displays are placed in overlaying indexed relationship to each other the tabs are laterally offset from one another.

2. The visualizer of claim 1 wherein the indexing means is a strip of flexible material which is secured diagonally across the corners formed by the indexing edge and the side edges so as to form a display receiving corner pocket and the flexible material is transparent.

3. The visualizer display device of claim 2 wherein the detachable securement means for the row of sleeves is at least one snap fastener and the fastener is positioned so that the row of sleeves may be transposed end for end on the storage pouch.

4. The visualizer display device of claim 2 wherein the detachable securement means for the row of sleeves is a tongue which projects into a mating slot in the storage pouch and the tongue and slot are positioned so that the row of sleeves may be repositioned end for end on the storage pouch.

5. The visualizer display device of claim 2 wherein the detachable securement means for the row of sleeves is a tongue and loop.

* * * * *